United States Patent Office 3,210,031
Patented Oct. 5, 1965

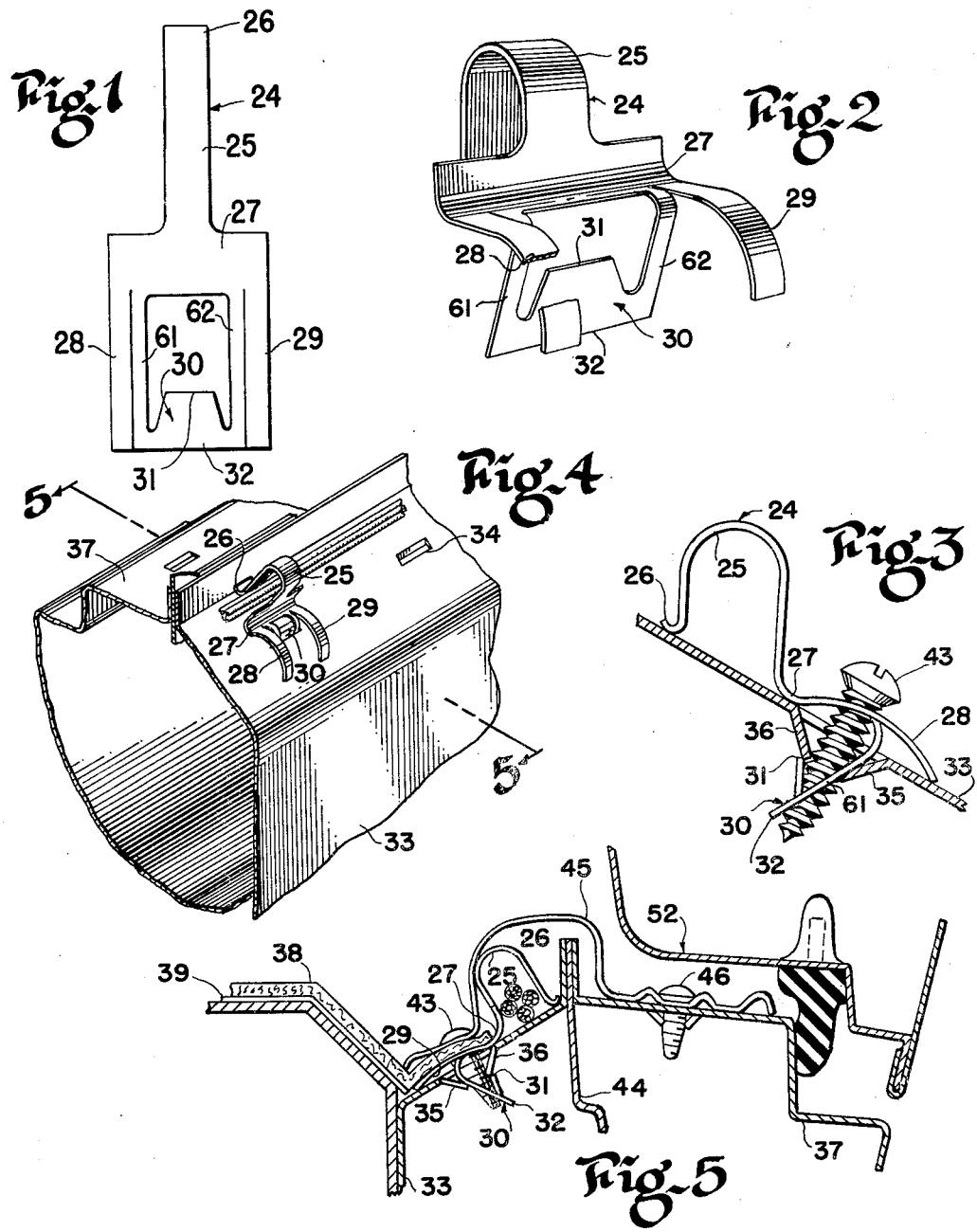

3,210,031
ELECTRICAL HARNESS CLIP
Robert A. Munse, Perrysburg, Ohio, assignor, by mesne assignments, to The Bishop and Babcock Corporation, Toledo, Ohio, a corporation of Ohio
Filed Jan. 14, 1963, Ser. No. 251,413
10 Claims. (Cl. 248—73)

This invention relates to fastening devices and more particularly to a spring clip type fastening device.

Heretofore various types of fastening devices have been tried to confine a plurality of cables leading from the power source at the front end of an automobile to the utilization devices at the rear end. Some auto manufacturers have adopted the longitudinally extending, previously unused and comparatively unobstructed door sill area for the cable conduit between the front and rear of the auto. Recognizing that the door sill was being used to secure, by screws and other coupling means, the floor mat as well as the threshold plate, a cable retaining device was felt to be necessary in order to prevent insulation damage to the cables, with ultimate electrical shorting therebetween by contact of the cables with the screws during the assembly stage. However the prior cable retaining devices have proven to be inadequate for they have failed to retain the cables from contact with the screw threads during the assembly stage for various reasons. The chief inadequacy of the prior cable retaining devices have been their inability to provide a tight fit between the retaining device and the support surface door sill which would thereby prevent the cables from working therefrom during the assembly stage.

It is accordingly an object of this invention to provide a simple and effective cable retaining clip which is capable of confining a plurality of cables to a safe chamber area and thereby prevent insulation damage thereto.

It is a further object of this invention to provide a spring clip which is capable of insertion into a supporting structure having flanged slots of irregular dimensions and to achieve firm and positive engagement of the clip with the supporting structure.

It is a further object to provide an improved fastening device which can be mounted in a snug, tight fitting relation to a support surface having a single face of accessibility.

It is a further object to provide a fastening device which is insertable into a screw receiving slot of an associated element and yet not interfere with the mating relationship of the screw threads to the slot edges.

It is a further object of this invention to provide a self-adjusting, self-locking clip which is of simple design and capable of installation without the use of rigid fastening means, and which is not susceptible to any rocking motion, dislodgement or separation from the supporting member after it has been installed.

It is still another object of this invention to provide a self-adjusting cable retaining device which is compatible with presently existing automobile body sill and rocker panel design.

These and other objects of my invention will become apparent from the following detailed description taken in connection with the appended claims and the accompanying drawings wherein:

FIG. 1 is a plane view of a metal blank from which the spring clip is formed;

FIG. 2 is a partially broken away perspective view of the spring clip fully formed;

FIG. 3 is a side elevation view of the spring clip mounted in a fastening position to a slotted supporting surface, and illustrates the working relationship of the clip relative to the slot flanges and the screw threads;

FIG. 4 is an isometric view of a section of the body sill with a rocker panel attached thereto, and depicting the clip inserted into a slot in the body sill;

FIG. 5 is a sectional side elevation view taken through the lines 5—5 of FIG. 4 with the car door, floor mat, threshold plate, and screws holding the latter two elements in place added.

Now, with reference to the details of the drawings illustrating the preferred embodiment of the invention and beginning first with FIG. 1, there is shown the blank stamping of the clip prior to the shaping operation.

In FIG. 2 there is illustrated in a more recognizable form the preferred embodiment of the invention after it has been fully shaped. As shown thereat a head in the form of a U-shaped cable retaining strap or clamp is provided by bending the longitudinal member, designated by numeral 24 in FIG. 1, at a point intermediate its ends. Also, as better shown in FIGS. 3 and 5 one extremity, 26, of the longitudinal member 24 is turned out and back upon itself to eliminate the sharp inner edge of the member 24 from the cable retaining area and thereby prevent any possible insulation damage. Further, the upturned end 26 provides a good bearing surface to ride upon the outer surface of a supporting structure. It is of course obvious that the head portion, which in this case is intended to house cables and accordingly is given an arcuate or U-shape is capable of different configurations depending upon the shape of the article to be secured or the function to be achieved.

As shown in FIG. 2, the other end of the longitudinal member 24 forming the strap 25 is integrally connected to a base portion 27 at one side of said base and intermediate the ends of that side. Because the U-shaped head portion is made with a lesser width than the base portion an increase in its flexibility and resiliency results. At the same time the greater length of the base portion 27 results in an elongated bearing surface which provides for better clip stability. The length of base portion 27 will vary with application, however, in this case it was made to be somewhat greater than the length of the slot in which the clip is secured to thereby achieve clip stability relative to the slot.

Connected in a manner as shown in FIG. 2, to opposite ends of the other side of the elongated base portion 27 and extending in a direction therefrom opposite to that of the U-shaped head 25 are resilient bowed spring fingers 28 and 29. Since, as has been pointed out, the base portion 27 is of a length which is somewhat greater than the length of the slot into which the clip is to be inserted, it accordingly follows that the spring fingers will be spaced approximately a slot length apart. In the above manner the clip will have achieved stable equilibrium through at least three surfaces of contact with the supporting structure upon which it is to be mounted, namely; the elongated bearing surface of the base portion 27, and the free ends of the spring fingers 28 and 29.

Depending from the same side of the base portion 27 to which the resilient fingers are connected and having one side thereof integrally connected thereto, in the manner generally shown by FIG. 2, is a shank 30 having a frame form. As shown in FIGS. 3 and 5, the sides of the frame shaped shank lie in a plane which forms an acute angle to the plane of the supporting surface 33. Also, as shown in FIGS. 1 and 2, a latching tab 31 bent out of the plane of frame 30 and inwardly in a direction toward the elongated base portion 27 is provided. The angular relationship between the latch tab 31 and depending frame 30 is better illustrated in FIGS. 3 and 5. Also, as clearly brought out in FIG. 3, which shows, in a side view, the preferred form of the invention mounted to a flanged aperture. The angular relationship between tab 31 and the plane in which the frame shaped shank elements lie must be of such dimension that the linear distance between the surface of frame 30 which is in contact with the inner surface of flange 35 and the surface of tab 31 which cams against flange 36 in a plane defined by the ends of flanges 35 and 36 is greater than the spacing between the flanges 35 and 36 in that plane. In this manner a force fit between the clip shank and the flanged opening of the supporting surface is achieved. Furthermore, once the clip shank is forced through the flanged opening the latching tab will spring into locking relationship therewith. The slot opening as defined by the linear distance between the extremities of flanges 35 and 36 prescribes the size of screw to be used therewith.

FIG. 3 brings out in diagrammatic form the manner in which the novel spring clip is capable of blind mounting on a supporting surface 33 having a flanged slot. In this figure the supporting surface 33 is intended to represent any of the many supporting surfaces which are only accessible from one side and therefore require a blind mounting type clip.

In installing the spring clip to secure the head portion 25 in yieldable relation to the supporting structure the shank portion of the clip will pass through the opening defined by flanges 35 and 36 by compression of the frame 30 and the latching tab 31. After insertion the latching tab will spring back to its normally biased position and lock behind flange 36. Also as shown the elongated surface 27 will be positioned on and along one side of the flanged slot, while the spaced apart spring fingers 28 and 29 will extend from the elongated surface 27 to the other side of the slot, this is shown more clearly in FIG. 4. The effect of the elongated bearing surface 27 on one side of the flanged slot and the spaced apart bearing surfaces provided by fingers 28 and 29 on the other side of the slot is twofold. Firstly, it results in a stable equilibrium of the spring clip relative to the flanged slot. In addition it results in an upwardly directed flexing force which latches tab 31 into engagement with the flange 36 and presses a surface of frame 30 into engagement with the inner surface of flange 35.

As shown in FIGS. 1 and 2 the frame shaped shank 30 is made up of relatively narrow sides 61 and 62 and therefore is provided with a large opening therein. It is within this open area, between sides 61 and 62, of frame 30 that the thread portion of the screw 63 engages the inner edge of flange 35, and in this manner the clip in no way interferes with the normal operation of the screw receiving slot. Furthermore, since tab 31 engages the back surface of flange 36 it also will not interfere with the screw thread engagement of the inner surface of the flanged surface.

Because of the angular disposition of the latching tab 31 relative to frame 30 a locking relationship between varying dimensioned and inclined sides of the flanged opening is obtainable by merely varying the curvature of the gripping fingers 28 and 29 to a greater or lesser extent and thereby achieve the proper operable relationship between the frame, its latching tab and the flanges. Also, because of the resulting flexing forces established by the resiliency of the spring fingers 28 and 29 and the frame 30 along with its associated tab 31, the head element 25, and in this example assuming a U-shaped form, is urged into firm contact with the support structure 33. Accordingly, because of the forces along the elongated bearing surface 27 no elements, and in this case cables, will be able to slide from within the head portion 25 between surface 27 and supporting surface 33 into the sharp threads of screw 43 at the time that it is being screwed into flanges 35 and 36.

FIG. 4 depicts in isometric fashion the mounting of the spring clip into one of a plurality of slots 34 of automobile body sill 33. It should be understood that as many spring clips as is felt desirable can be mounted in the plurality of screw receiving slots, 34, available, however for purposes of explanation only one such mounting will be shown and explained. Also shown in FIG. 4 is the manner in which a plurality of cables are retained by the U-shaped strap 25. The actual working relationship between the clip elements and the slot flange is better seen in FIG. 5, which is a sectional of FIG. 4 along the line 5—5, and shows the rocker panel 37 rigidly connected to body sill 33 with car door 52 in a closed position, and with the floor mat 38 and the threshold plate 45 screwed in place.

In mounting the spring clip into operable relationship with a slot of body sill 33, and which would be done in the original manufacture of an automobile before the car mat 38 or threshold plate 45 has been installed, the frame-shaped member 30 is inserted into the slot opening 34, having flanges 35 and 36, in the manner shown in FIGS. 3 and 4. Furthermore, as also shown thereat the curved resilient fingers 28 and 29 are positioned to span or bridge slot 34 and are illustrated with their ends contacting the still 33 a substantial distance from slot 34. Base 27, to which fingers 28 and 29 are integrally connected is shown in FIG. 4 to be in contact with sill 33 on the side of slot 34 opposite to that of the free ends of fingers 28 and 29. In this manner a flexing force is transmitted to the frame 30 to urge it in an upward direction. The upward urging force will cam the latching tab 31, which is integrally mounted on frame 30, against the underside of slot flange 36 in the manner shown in FIG. 5. The result of the opposing forces established by the flexing of resilient fingers 28 and 29 and the camming of spur 31 against flange 36 supplies a downwardly directed force to the legs of the U-shaped strap 25. In this manner a tight engagement is achieved between the U-shaped strap and the upper surface of sill 33, and extrication of the cables therein is accordingly prevented.

After the spring clip is placed in operable relation to the sill 33 the floor mat 38 and threshold plate 45 are removably secured in place by screw 43. The unique design of the spring clip hereinabove described permits its utilization of the same slot 34 which is to receive screw 43 and affords no obstruction thereto. This is accomplished by designing frame 30 with sufficient transverse dimension so as to straddle the screw diameter and by inclining the frame with respect to surface 33 so that the lower cross bar 32 from which tab 31 extends and tab 31 are outside the region bounded by the planes normal to surface 33 and extending through the innermost edges of flanges 35 and 36. The screw 43 can then be removably mounted in the slot 34 by engaging its threads with the edges of flanges 35 and 36 without having its end projecting beyond those edges interfere with the frame bar 32 and tab 31.

The invention is not to be limited to the exact arrangement of the parts shown in the accompanying drawings are described in the specification as various changes in the details of manufacture may be resorted to without departing from the spirit of the invention.

Having described the invention, I claim:

1. In combination a support structure having a first surface and having a slot of a given length with marginal longitudinal flanges projecting inwardly from the first surface, a spring clip for blind mounting on said first surface, comprising a resilient body of sheet material, a pair of resilient bowed fingers spaced apart a distance generally corresponding to the slot length extending from said body such that with the resilient body contiguous with and adjacent the longitudinal dimension of the slot said fingers will bridge the slot and contact the support structure at two spaced apart surfaces, a shank of frame form extending from the same side of said body as said bowed fingers in a plane forming an acute angle with the plane of the supporting surface on the body contacting slot side, an upwardly extending latching tab bent out of the plane of said frame in a direction toward said contacting body, the flexure forces of said fingers creating an upwardly directed force to latch said tab beneath a flange, a screw of a given thread diameter for threadingly engaging the inner surfaces of the flanges, the sides of said extending frame shaped shank being spaced apart a distance greater than the thread diameter of said screw to permit concurrent usage of the flanged slot therewith.

2. A unitary spring clip cable retaining device of the class described for confining a plurality of electrical cables to a predetermined area of an automobile rocker panel and thereby preventing insulation damage thereto and subsequent shorting therebetween, fastenable into a secured relationship to the rocker panel by insertion into and engagement with a flange of a screw-receiving slot along one of the rocker panel surfaces comprising, a strip of resilient material bent to provide a U-shaped cable strap intermediate the ends of said resilient material, a base portion of the form of a cylindrical segment having one side integral with an end of said U-shaped cable strap, to provide a smooth arcuate bearing surface for engagement with the surface of said panel, a pair of arcuate flexible fingers extending away from said U-shaped strap one each integrally connected to the side of said cylindrical segment of said base opposite said one side and spaced apart along said side, said fingers having their bowed surfaces extending in the same general direction as said U-shaped strap, a frame-shaped member having one of its sides integrally connected to the side of said cylinder segment of said base opposite said one side, said frame depending from said base between said arcuate extending fingers, and a securing tab integrally connected to said frame and extending toward said base and outwardly from the side of said frame opposite the frame side integrally connected to said base to engage the flange of said slot when said clip is mounted on said panel, whereby the ends of said U-shaped strap will be held in contact with a rocker panel surface upon the insertion of said frame-shaped member into the flanged slot.

3. The combination as described in claim 2 wherein said securing tab is integrally connected to said side of said frame and extends out of the plane of said frame toward said base to a limit spaced from the plane of said frame along the plane between the opposed longitudinal margins of said slot a greater distance than the spacing of those longitudinal margins in said plane.

4. A spring clip fixably mountable upon a wall having a screw-receiving slot comprising a strip of spring metal having a cylindrical portion intermediate the ends, a first leg member having one end integrally connected to a first side of the cylindrical portion and its other end turned back toward said cylindrical portion to thereby provide a rounded bearing surface to the wall, first and second resilient arcuate fingers one end of each being integrally connected at opposite ends of the second side of said cylindrical portion and being of sufficient length to bridge the screw-receiving slot, a resilient frame-shaped shank member having one side thereof integrally connected to the second side of said cylindrical portion and depending therefrom for entry into the screw-receiving slot, an upwardly and outwardly extending flange engaging tab integrally connected to the side of said frame opposite to the side connected to the second side of the cylindrical portion and engaging said wall adjacent one of the longitudinal margins of said screw-receiving slot in a non-screw interfering position, whereby said flange engaging tab is securely held thereto by the flexing force provided by the arcuate resilient fingers.

5. The combination as described in claim 4 wherein said resilient frame-shaped shank member is integrally connected to and depends from the second side of said cylindrical portion between the first and second resilient arcuate fingers.

6. A spring fastener for blind mounting in an elongated slot of a wall comprising a base adapted to provide a bearing surface on a front face of said wall along one longitudinal margin of said slot over a length greater than said slot, a pair of arcuate spring fingers each having a first end integral with said base and adapted to provide at their second ends spaced bearing surfaces on the front face of said wall, a frame between said fingers having a side integral with said base and extending therefrom in a direction generally opposite the convex arc of said fingers, said frame having a length between said fingers less than the length of said slot and forming with its major body portion spaced from said base an acute angle with the portion of the plane adjacent said base and defined by said bearing surfaces, and a tab extending from the side of said frame opposite said base toward the plane defined by said bearing surfaces to a position closer to said plane than the separation of the rear face of said wall at the longitudinal margin of said slot from the general plane of the front surface of said wall, the extension of said tab from the general plane of said frame at the plane of the opposed longitudinal margins of said slot exceeding the separation of said margins in said plane, said side of said frame opposite said base and said tab falling outside the region between planes generally normal to the wall and including the innermost longitudinal margins of said slot.

7. In combination a support structure having a first surface and having a slot of a given length with marginal longitudinal flanges projecting inwardly from the first surface and adapted to be threadably engaged by a screw, a spring clip for blind mounting on said first surface, comprising a resilient body of sheet material, a pair of resilient bowed fingers spaced apart a distance generally corresponding to the slot length and extending from said body such that with the resilient body contiguous with and adjacent the longitudinal dimension of the slot said fingers will bridge the slot and contact the support structure at two spaced apart surfaces, and spring clip latching means attached to and depending from said body between said arcuate fingers and having a spur formed thereon, said spur extending upwardly and outwardly out of the plane of said latching means in a direction toward said contacting body, the flexure forces of said arcuate fingers creating an upwardly directed force to latch said spur beneath a flange.

8. In combination a support structure having a first surface and having a slot of a given length with marginal longitudinal flanges projecting inwardly from the first surface, a screw capable of removable attachment to said flanges, a spring clip for blind mounting on said first surface, comprising a resilient body of sheet material, a pair of resilient bowed fingers spaced apart a distance generally corresponding to the slot length and extending from said body such that with the resilient body contiguous with and adjacent the longitudinal dimension of the slot said fingers will bridge the slot and contact the support structure at two spaced apart surfaces, a pair of spaced apart depending fingers, attached to said contacting body between said arcuate fingers and lying in a plane which crosses the plane defined by the longitudinal axis of said slot and the axis of said attached screw, said fingers having latching tabs formed thereon lying in a plane which extends outwardly and upwardly from the plane of said depending fingers in a direction toward said contacting body, the flexure forces of said arcuate fingers creating an upwardly directed force to latch said tabs beneath one of said flanges, said depending fingers being spaced apart a distance greater than the thread diameter of said screw to permit concurrent usage of the slot by the spring clip and said screw.

9. A spring clip formed of resilient sheet material comprising a base having a curved surface and having first and second longitudinal sides, a pair of fingers extending from said first side of said base at the opposite ends of said first side of said base, said fingers being bowed to form faces lying in a common surface curved in an opposite sense to the curve of said base and having an open region therebetween, a frame having said first longitudinal side of said base between said fingers as a first side, opposed second and third spaced sides for said frame extending from said base adjacent and between said fingers, a fourth side for said frame coupling said second and third sides in a region remote from said base, said base and the ends of said fingers lying in a first plane, portions of said second and third sides of said frame extending through said first plane over an arc of smaller radius than the bow of said fingers and with said fourth side lying in a second plane forming an acute angle with that region of said first plane tangent with said base, and a latching tab integral with said frame and extending out of said second plane from said fourth side, said tab having a free end adjacent and extending toward said base.

10. A combination according to claim 9 including a resilient clamp extending from the second longitudinal side of said base and having a U-shaped cross section in a plane normal to said first plane and on the side of said first plane with said fingers, and a bearing surface extending at least to said first plane on the end of said U-shaped resilient clamp remote from said base.

References Cited by the Examiner
UNITED STATES PATENTS 2,231,153  2/41  Camiener _____ 248—73
3,066,900  12/62  Holton _____ 248—73

CLAUDE A. LE ROY, *Primary Examiner.*